United States Patent [19]

Von Holdt

[11] Patent Number: 4,632,357
[45] Date of Patent: Dec. 30, 1986

[54] MOLD FOR MAKING A BUCKET WITH BAIL

[76] Inventor: John W. Von Holdt, 7430 N. Croname Rd., Niles, Ill. 60648

[21] Appl. No.: 680,736

[22] Filed: Dec. 12, 1984

[51] Int. Cl.⁴ ............... B29C 39/34; B29C 45/26
[52] U.S. Cl. .............................. 249/58; 249/64; 249/68; 249/98; 249/122; 249/142; 249/144; 249/161; 425/577; 425/588; 425/DIG. 5; 425/DIG. 58
[58] Field of Search ............... 249/58, 64, 66 C, 68, 249/144, 160, 63, 67, 83, 91–96, 142, 144, 160, 98, 122, 161; 264/242; 425/DIG. 5, DIG. 58, DIG. 121, 556, 577, 588, 589

[56] References Cited

U.S. PATENT DOCUMENTS

| | | | |
|---|---|---|---|
| 3,861,840 | 1/1975 | Heisler | 249/58 |
| 4,114,849 | 9/1978 | Von Holdt | 249/58 |
| 4,125,246 | 11/1978 | Von Holdt | 249/58 |
| 4,172,577 | 10/1979 | Von Holdt | 249/58 |
| 4,210,620 | 7/1980 | Von Holdt | 264/242 |
| 4,432,127 | 2/1984 | Diazzi | 264/242 |
| 4,518,143 | 5/1985 | Blanchette | 249/142 |

Primary Examiner—Willard E. Hoag
Attorney, Agent, or Firm—Charles F. Pigott, Jr.

[57] ABSTRACT

A mold for making a bucket having a pivoted handle. The mold has cooperating mold parts defining cavities for molding a bucket and slotted bail retention means. The mold parts are movable only linearly to release the molded product.

15 Claims, 11 Drawing Figures

FIG. 1
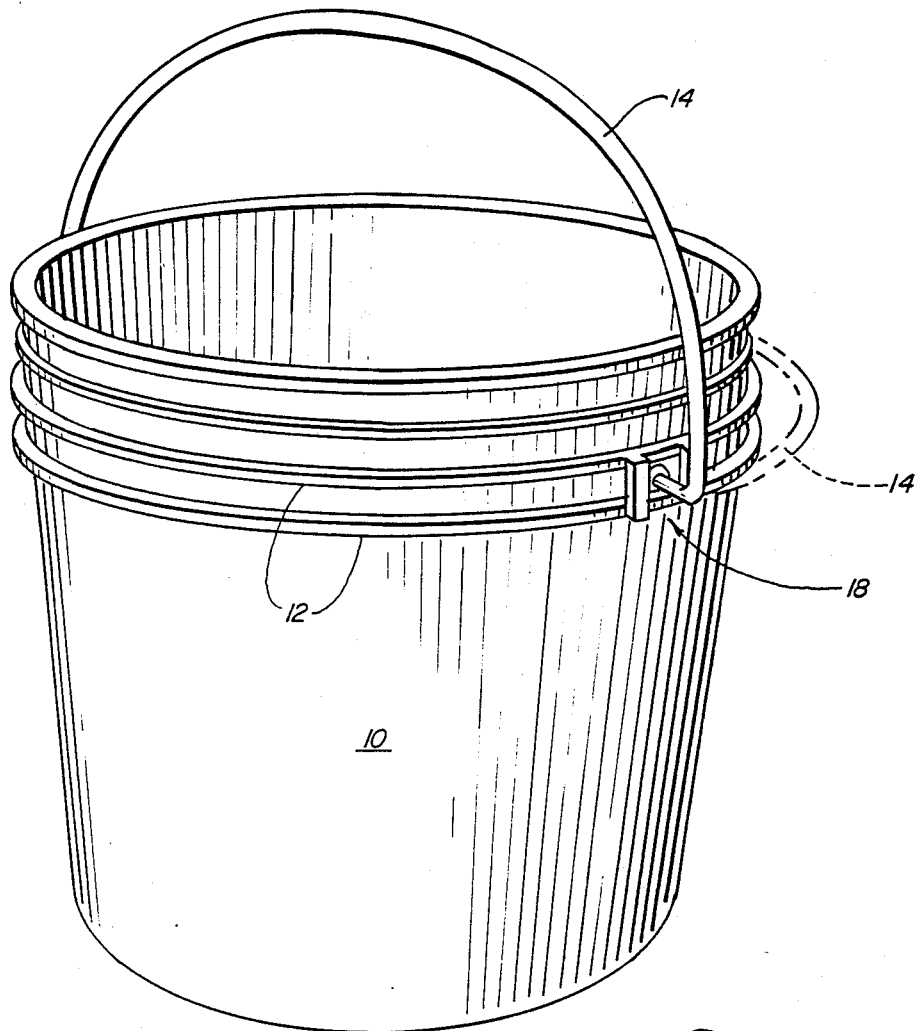
FIG. 2
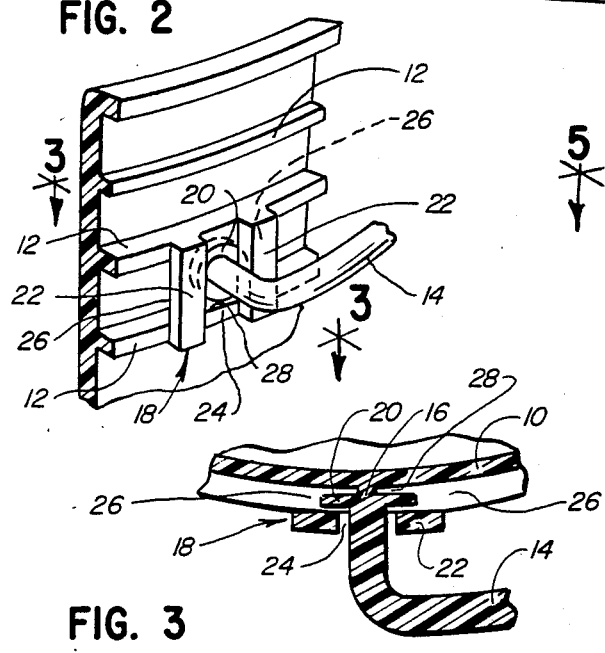
FIG. 3
FIG. 4
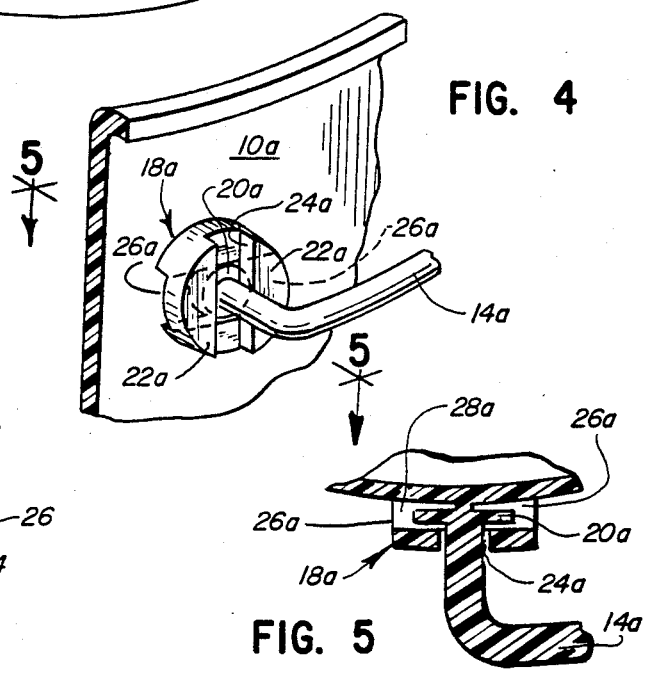
FIG. 5

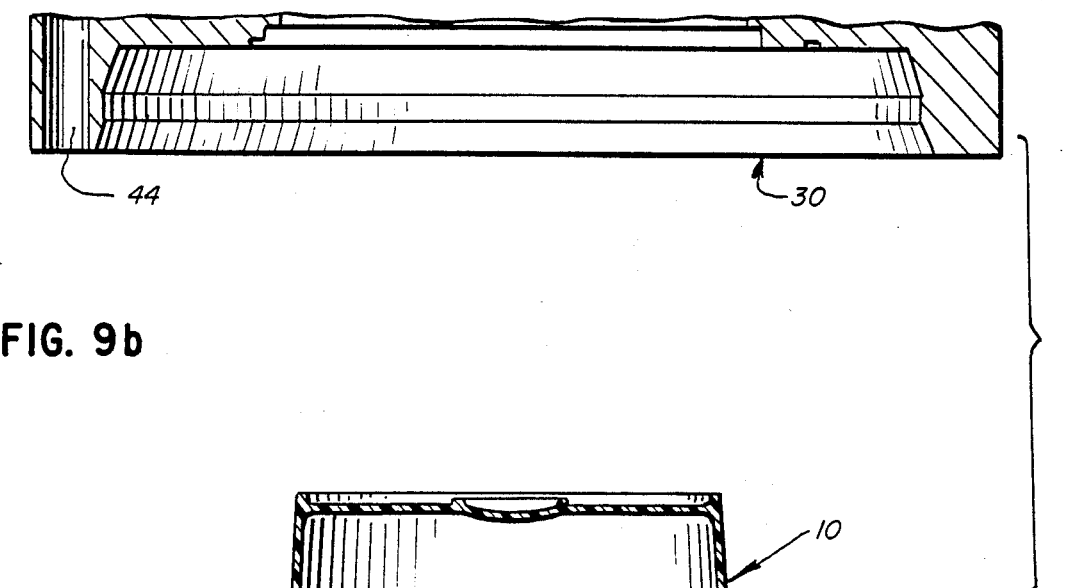
FIG. 9b
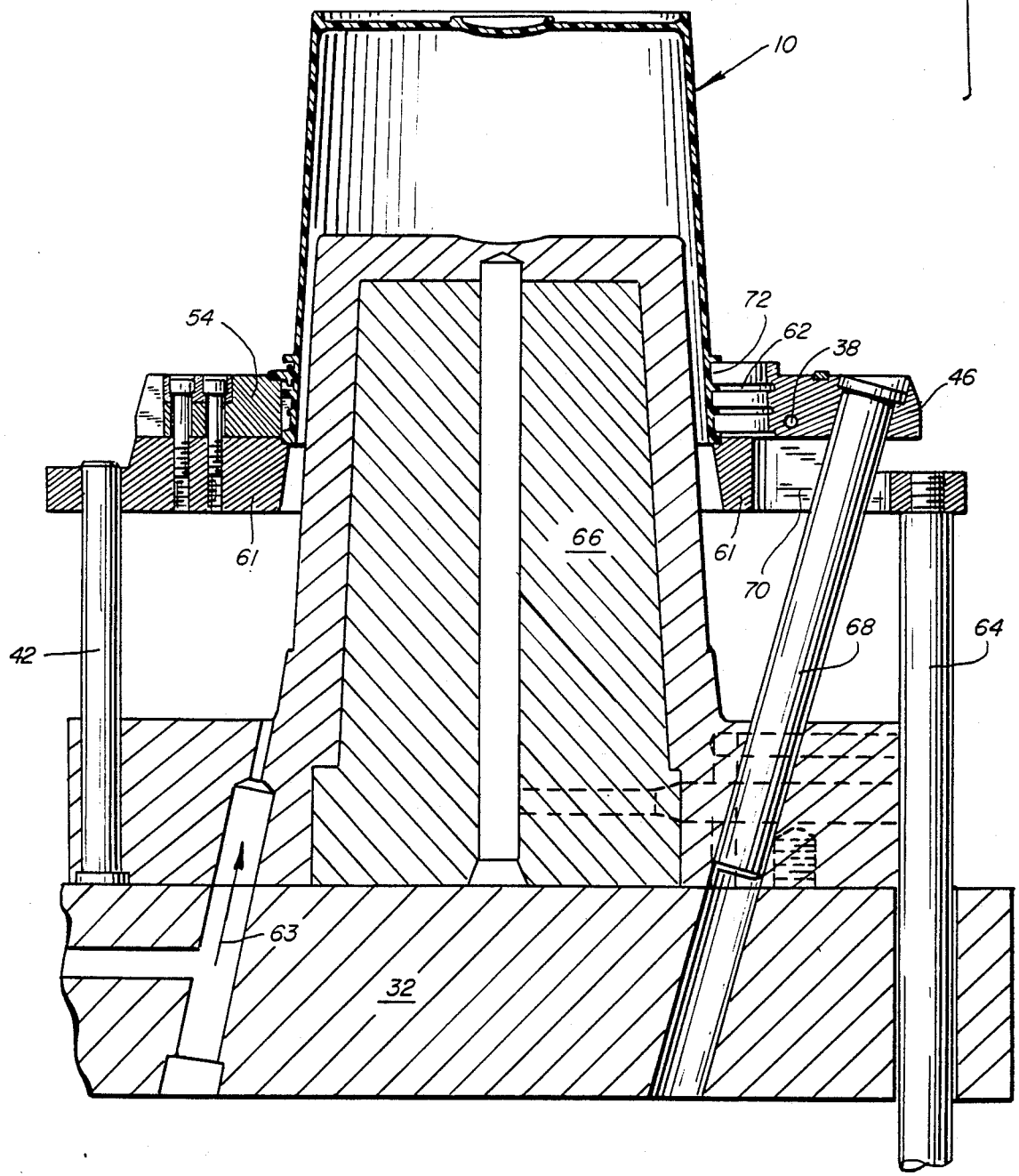

MOLD FOR MAKING A BUCKET WITH BAIL

BACKGROUND OF THE INVENTION

In Von Holdt U.S. Pat. Nos. 4,476,083; 4,210,620; 4,172,577; and 4,125,246, molds are disclosed which are capable of simultaneously molding a bucket and its handle in which the handle can swing freely from side to side and in fact can become a separate piece from the rest of the bucket upon use, while remaining captured with the bucket. Some of the designs disclosed in the above cited patents are in commercial use, constituting a significant advance over buckets with separately molded handles.

However, certain disadvantages exist in the prior technology for manufacturing buckets with simultaneously molded, free swinging handles. For example, some of the prior molds are rather complicated in their action and difficult and expensive to manufacture. Furthermore, some of the prior molds are subject to self-destruction as the mold closes if certain of the moving parts stick in their moving action so as to be in the wrong position for the closed mold. Such, of course, is a very significant drawback because molds are very expensive.

Furthermore, there is a need for greater efficiency in molding action, with a shorter cycle.

By this invention significant improvements over the prior molds are provided. The mold of this present invention is far less likely to encounter self-destruct problems due to an unnoticed malfunction of the position of its internal parts when the mold closes. Likewise, the mold of this invention can operate with a shorter mold cycle since, contrary to the prior molds, the critical parts involved in the formation of the handle retention chambers and the ends of the handle handle may contain fluid cooling flow lines.

DESCRIPTION OF THE INVENTION

In this invention a bucket is provided having a pivotable handle secured at opposed sides of the bucket. By this invention, integrally molded handle retention chambers are provided on opposed sides of the bucket, with the bucket handle terminating at each end in an enlargement positioned within one of the handle retention chambers. The handle retention chambers each define on its outer surface a first slot opening extending thereacross through which the handle extends. The first slot opening is of insufficient size to allow removal of the enlargement from the handle retention chamber.

Each handle retention chamber also defines, inwardly from its outer surface, opposed side openings defining a second slot extending thereacross in a direction substantially normal to the direction of the first slot.

Preferably, the direction of the second slot is substantially normal to the ax is of the bucket, the axis of the bucket being typically the same as the direction of mold opening and closing in the mold which manufactures the bucket.

In accordance with this invention a mold assembly is also disclosed for making buckets of the type previously described. By this invention openable and closable first and second mold halves are provided defining a first molding chamber between them of the shape of the bucket and including handle retention chamber-defining means. This last named means includes opposed, movable mold members capable of end-to-end abutment in a molding position, and a spaced relation in a mold-open position to permit removal of the bucket molded therein.

The mold members define inner molding chambers formed between them in their end-to-end abutting relation for molding the enlargements on the handle ends.

Gate means are also provided communicating between the first and inner molding chambers, the molding chambers also forming the opposed side openings and second slots of the buckets which are molded in the mold halves.

Means are also provided for moving the mold members between the end-to-end abutment and spaced relations.

As an advantage of the mold assembly of this invention, the mold members typically move with "square" action in a manner generally perpendicular to the line of motion of the opening and closing mold halves, contrary, for example, to the diagonal action of analogous mold members found, for example, in U.S. Pat. No. 4,476,083. This provides substantial simplification of the manufacture of the mold and also improved operation.

The opposed movable mold members may also define the handle-forming mold chamber portion.

The mold halves may define a stationary portion, relative to the mold members, which forms a mold chamber portion for forming sections of the bucket handle adjacent to the enlargements. This stationary portion may move with a mold half as may the mold members, so the term "stationary" is understood to mean that the stationary portion does not partake of the specific individual motion of the mold members as they open and close, although the stationary portion may move with the mold halves. It is also preferred for the mold members to contain fluid cooling conduits. This provides a significant shortening of the mold cycle and consequent improvement in the mold operation.

DESCRIPTION OF THE DRAWINGS

In the drawings, FIG. 1 is a perspective view of a bucket having an attached, freely rotatable handle in accordance with this invention.

FIG. 2 is an enlarged fragmentary perspective view of a portion of FIG. 1.

FIG. 3 is a sectional view taken along line 3—3 of FIG. 2, shown in its as-molded position.

FIG. 4 is a fragmentary perspective view of a portion of another embodiment of the bucket of this invention, said portion being analogous to the portion of FIG. 2.

FIG. 5 is a sectional view taken along line 5—5 of FIG. 4.

FIG. 9b is a sectional view similar to FIG. 9a but showing the mold in its open position.

FIG. 10 is an enlarged fragmentary detailed view of a portion of the structure as shown in FIG. 9a.

DESCRIPTION OF SPECIFIC EMBODIMENTS

Figure 6:
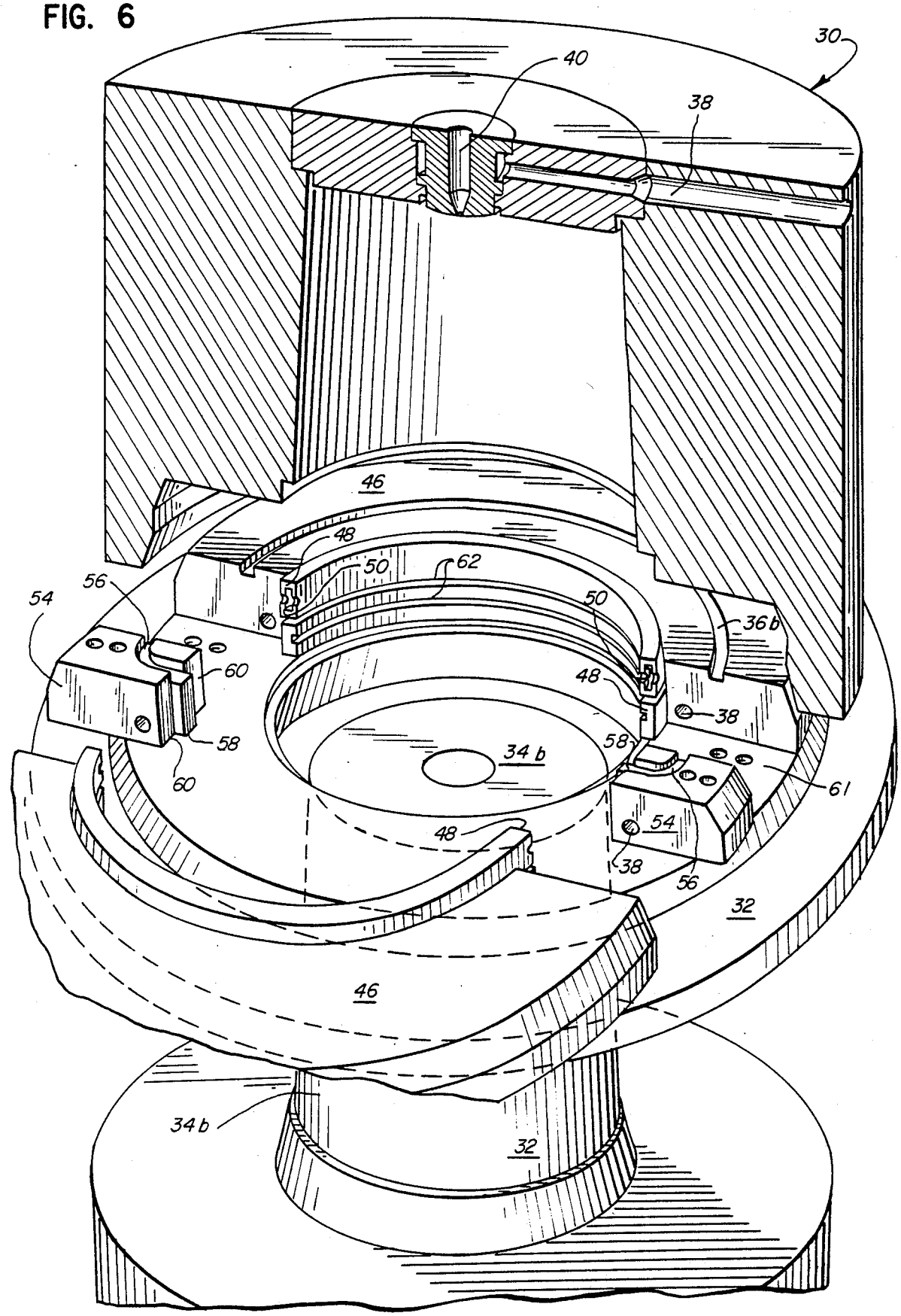
FIG. 6 is an exploded perspective view of a mold usable for manufacturing either of the buckets of FIGS. 1-5.

FIG. 1 shows one embodiment of a bucket which may be molded within the mold assembly described herein. Bucket 10 may be a tapered pail as shown, or it may be straight-walled, having a series of optional annular flanges or ribs 12 near its upper end to provide hoop strength.

Handle 14 is initially formed integral to the remainder of the bucket 10 in the same molding operation that creates bucket 10. This integral relation is shown at FIG. 3, where, in the as-molded position, handle 14 can be seen to be connected to the remainder of bucket 10 by means of narrow connection portion 16.

Handle 14 is in its as-molded position in the position shown in phantom lines in FIG. 1. Handle 14 may then be rotated to its position of use as shown in full lines in FIG. 1, which causes connecting portion 16 to be severed. Thereafter, handle 14 is freely rotatable in the manner of a conventional bucket handle.

As shown in FIG. 1 and a more detailed view of FIG. 2, bucket 10 defines integrally molded handle retention chambers 18 on opposed sides of the bucket in which the ends of bucket handle 14 are captured. Both handle retention chambers 18 may be of identical design, with handle 14 carrying an integral enlargement 20 at each end, each of which is captured within a handle retention chamber 18 so that handle 14 may not be removed from the bucket.

Handle retention chamber 18 defines on its outer surface a pair of molded members 22 extending between a pair of annular ribs 12 and defining between them a first slot opening 24 through which handle 14 extends. First slot opening 24 is of insufficient width to allow removal of enlargement 20 from the handle retention chamber. Enlargement 20 is thus captured in a cage defined by the two molded members 22 and the annular ribs 12 across which they extend.

Each handle retention chamber 18 also defines, inwardly from its outer surface, opposed side openings 26 defining a second slot 28 extending across retention chamber 18 in a direction substantially normal to the direction of first slot 24. For example, as seen from the viewpoint of FIG. 3, first slot 24 extends perpendicular to the plane of FIG. 3, while second slot 28 extends within the plane of FIG. 3 in a horizontal direction. Thus slots 24, 28 are mutually perpendicular.

The design of this bucket handle connection provides a simplified and improved structure, which is more efficiently moldable by the mold apparatus of this invention and which exhibits advantages of strength, durability, and compact configuration when compared with the prior art.

As a further embodiment of the bucket on this invention, FIGS. 4 and 5 illustrate a fragmentary view of a bucket 10a which may also be straight-walled or tapered, in which the bucket 14a may be connected opposite sides of the bucket through a modified design of handle retention chamber 18a, analogous to retention chamber 18 in the previous embodiment and also positioned at opposed sides of the bucket. In bucket 10a optional annular ribs 12 are absent.

As in the previous embodiment, enlargement 20a is formed on opposed ends of bucket handle 14a, with the respective enlargements 20a being captured within handle retention chambers 18a.

As shown, first slot 24a is defined between molded members 22a as in the previous embodiment, with first slot 24a being of insufficient size to allow removal of enlargement 20a. Chamber 18a also defines, in a manner similar to the previous embodiment, opposed side openings 26a positioned inwardly from its outer surface, i.e., the outer surface of molded members 22a. Opposed side openings 26a define second slot 28a, which extends in a direction perpendicular to first slot 24a as in the previous embodiment, being open between opposed side openings 26a.

Accordingly, either embodiment of the bucket of this invention, as well as other embodiments that can be readily developed from the disclosures herein, provide an effective, useful, one piece molded bucket having a swingable bail handle.

Referring to FIGS. 6–10, the mold assembly for making buckets of the type previously described is disclosed.

First mold half 30, called the "mold cavity", and second mold half 32 are openable and closable relative to each other by conventional means to define in the closed position a first mold chamber 34 (FIG. 9a) for molding buckets and their integral handles.

Figure 7:
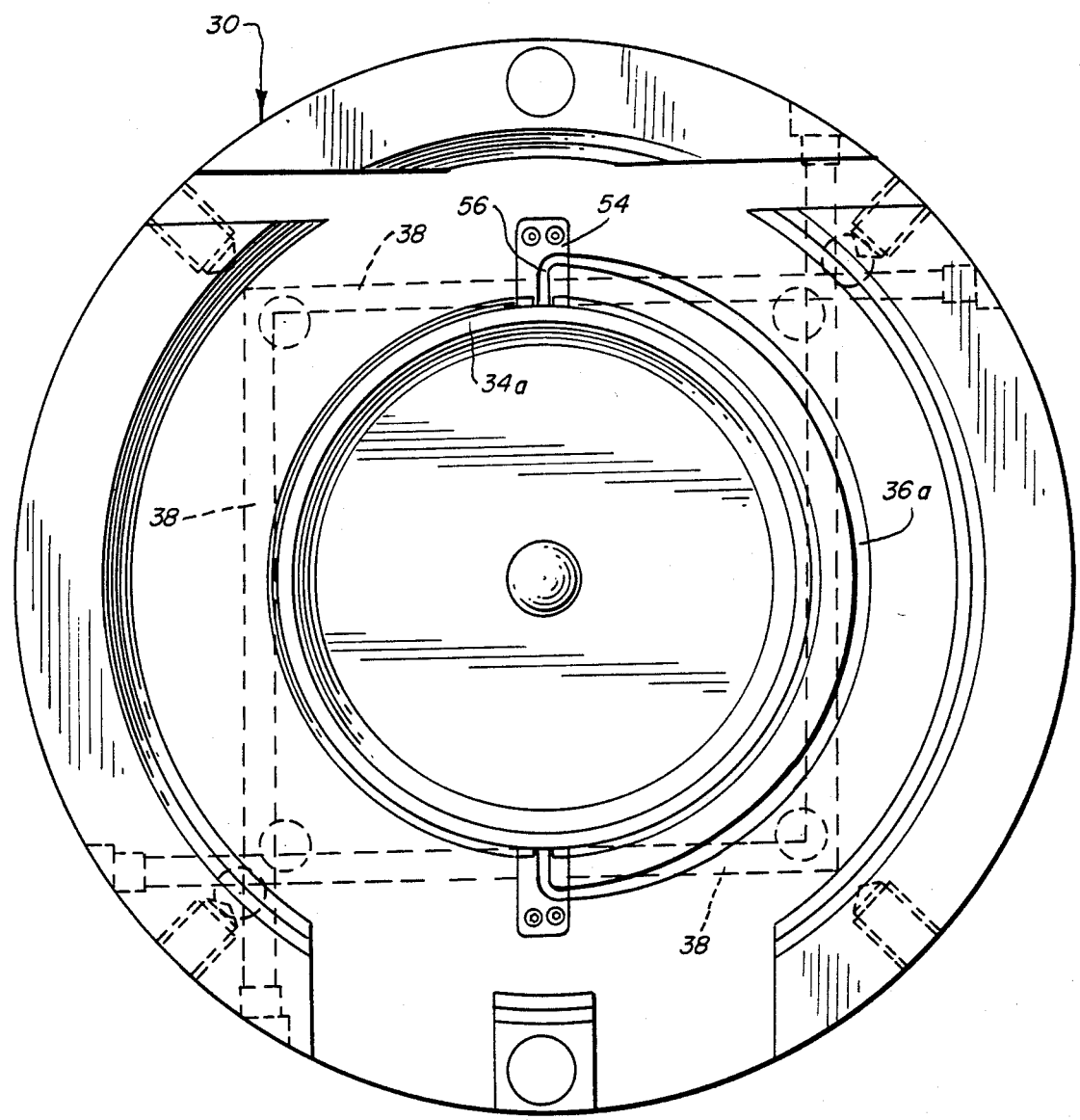
FIG. 7 is a bottom plan view of the upper mold portion of FIG. 6.
Figure 10:
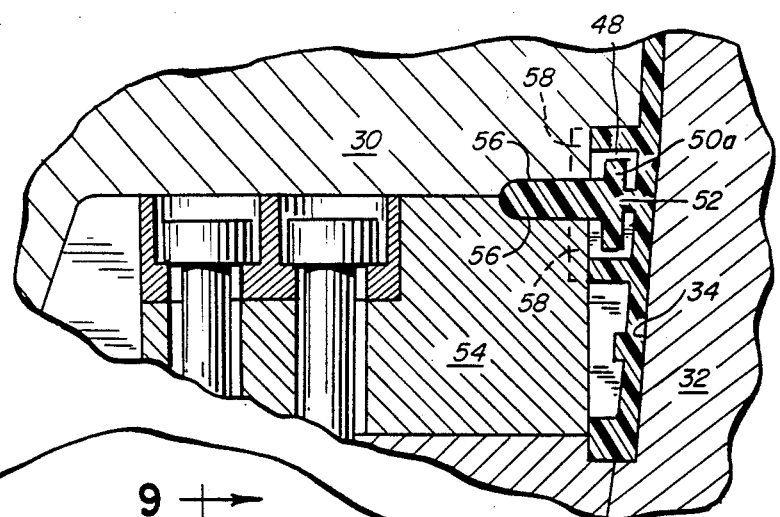

As shown in FIG. 7, mold cavity 30 defines an outer wall 34a which in turn defines the outer wall of mold chamber 34. The upper half of handle-forming chamber 36a is also shown.

Figure 8:
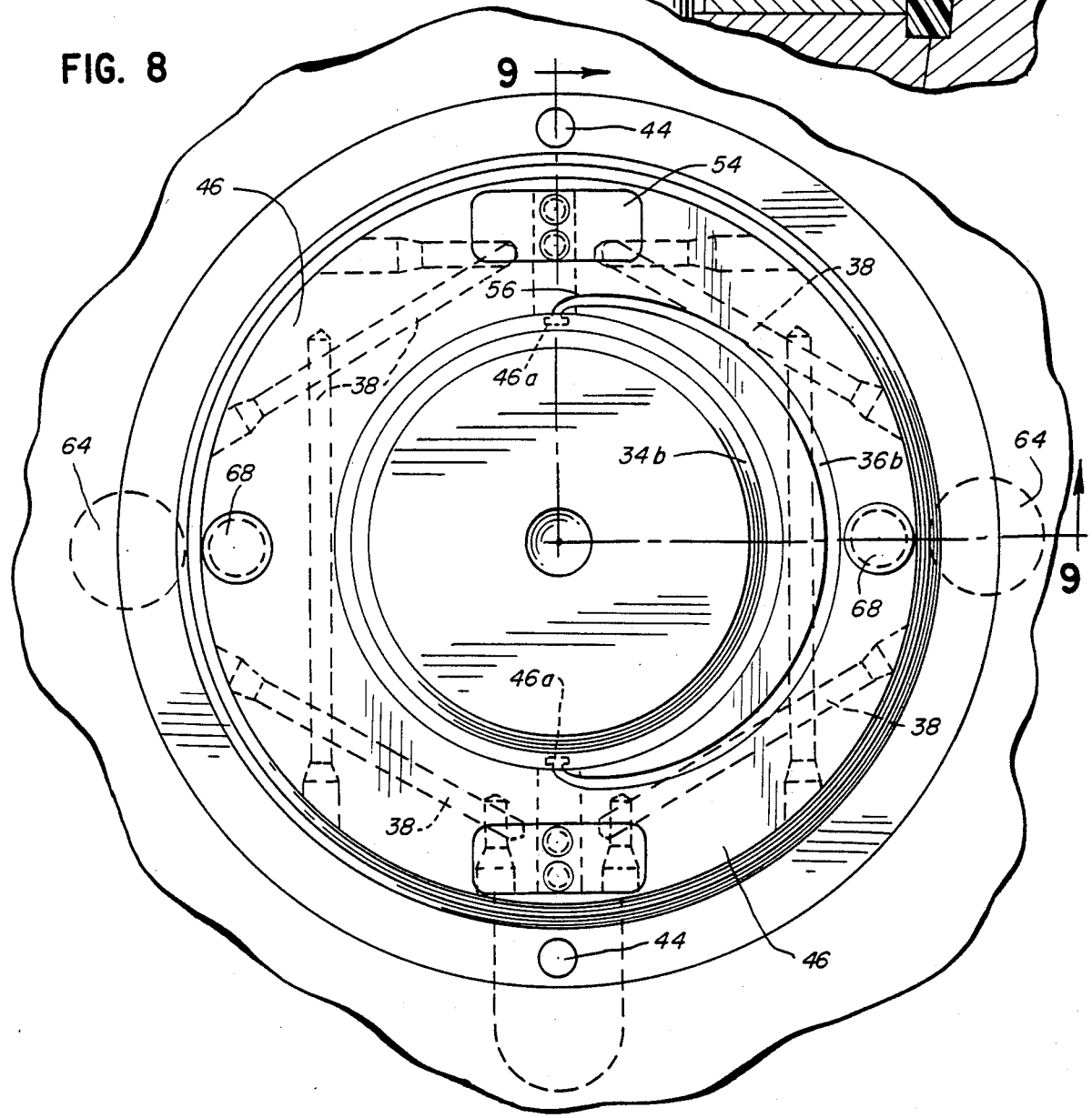
FIG. 8 is a top plan view of the lower portion of the mold of FIG. 6.

Referring to FIG. 8, the inner wall 34b of mold chamber 34 is disclosed, plus the lower half of handle-forming chamber 36b. Both mold halves 30 and 32 define cooling water flow channels 38 for providing cooling water to the mold assembly.

Mold sprue and access channel 40 may be provided in conventional manner to provide molding compound to mold cavity 34.

Figure 9A:
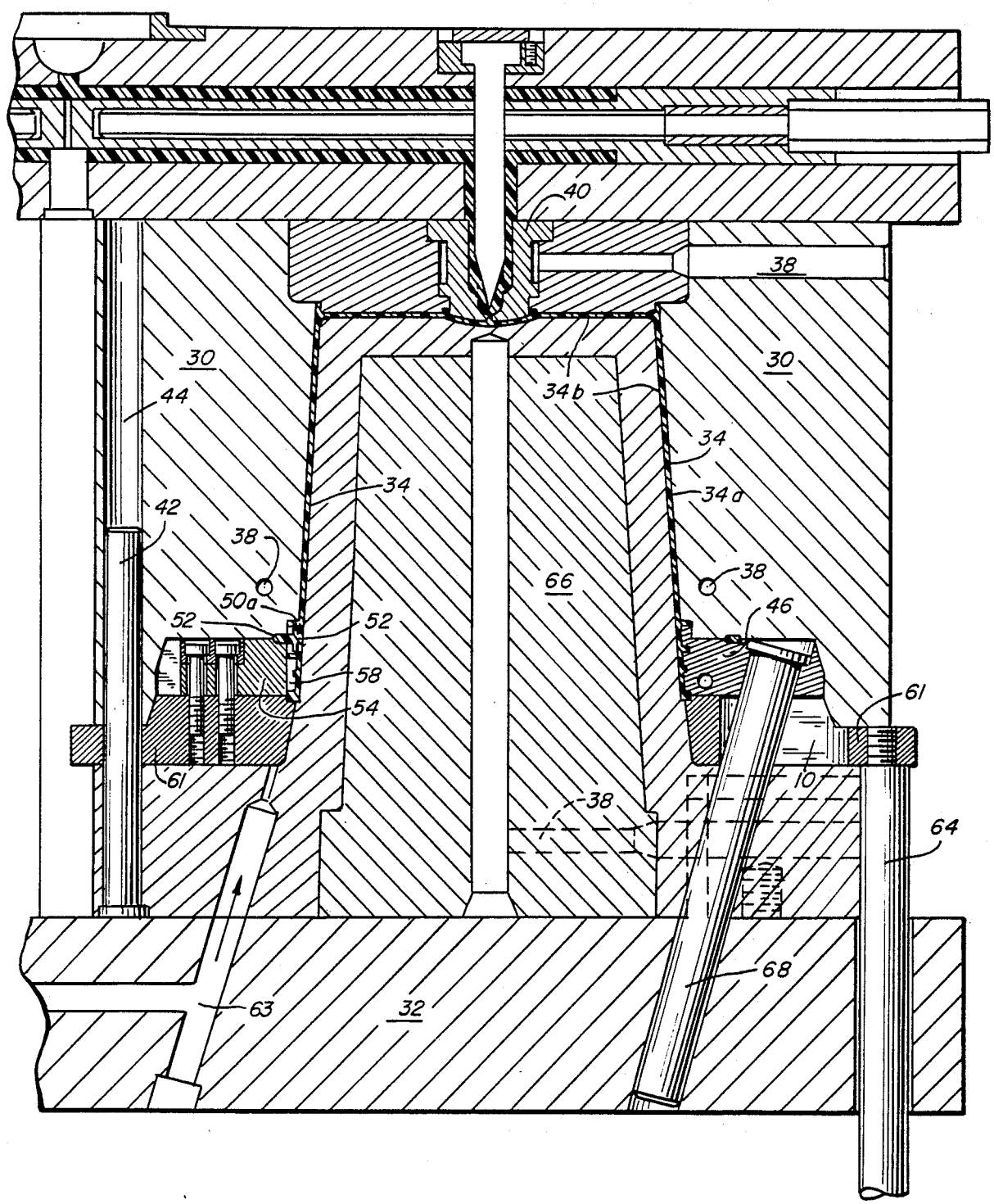
FIG. 9a is a sectional view taken along line 9—9 of FIG. 8 showing both the upper and lower mold portions in their closed position to define a bucket mold cavity.

As shown particularly in FIGS. 8 and 9a, alignment pin 42 carried by mold half 32 fits in aperture 44 of mold half 30 to facilitate proper alignment of the mold halves in their respective positions.

Except as otherwise specified herein, the molding equipment disclosed herein may be of conventional design, exhibiting a conventional mode of operation.

In accordance with this invention, means for defining the handle retention chamber means 18 includes opposed movable mold members 46 which may conveniently be of generally semicircular configuration as shown, for example, in FIGS. 6 and 8. Mold members 46 are capable of end-to-end abutment at their end portions 48 which abut together in molding configuration to bring end recesses 50 together of respective opposed mold members 46 to form an inner molding chamber 50a (FIGS. 9a and 10) for molding enlargement 20 on each end of handle 14 of buckets molded therein.

Gate means 52 (i.e., a small aperture) communicates between first molding chamber 34 and inner molding chamber 50a, which is defined by recesses 50 between the abutting ends 48 of mold members 46. The outer portion of inner molding chamber 50a defines an aperture which communicates with handle-forming mold chamber portion 56, which is formed in part by the abutting together of the closed mold halves and chamber portions 36a.

The opening and closing action of mold members 46 may be accomplished by conventional hydraulic shaft 64. Mold means 46 is shown in open position in FIGS. 6 and 9b, and in a closed position in FIG. 9a. In the closed position, the inner mold chamber 50a is formed, to permit the molding of enlargement 20. Then mold members can open as part of the entire mold opening process for release of the bucket.

Stationary portions 54 are placed at opposed positions between the respective ends of mold members 46. Stationary portions 54 are shown to be carried on lower mold half 32. However, both they and/or mold members 46 may be carried on the upper mold half 30 if desired with appropriate modifications of the mold assembly. Stationary portions 54 define groove portions 56 which serve to define part of the handle molding chamber in the closed position, as mentioned above.

Stationary portions 54 also define vertical projections 58 and recessed areas 60 (FIG. 6). When the mold assembly is closed, recessed areas 60 serve to define part of the open chamber area which forms molded members 22 as part of retention chambers 18, while projection 58 defines slot 24 between molded members 22. Inner mold chamber 50a in the closed position communicates with slot 56 which, in turn, communicates with handle chamber portions 36a and 36b in the mold-closed position, so that an integral handle and bucket can be formed by plastic flowing into mold chamber 34 through sprue 40. Second perpendicular slot 28 of each bucket molded in the apparatus is defined by the steel of mold member 46 surrounding each recess 50 and the like, which, in the closed position, passes in front of portions 60 in spaced relation thereto and into sliding, sealing contact with the face of projection 58, so that a negative version of the complex structure of the handle-retention members is formed by the mold upon the closing of mold members 46 together in conjunction with stationary members 54.

Horizontal grooves 62 are provided to form ribs 12 in the finished buckets produced by the molding apparatus of this invention.

There is substantial advantage in the fact that mold members 46 move between their molding and mold-open positions in a direction substantially normal to the direction of opening and closing of mold halves 30, 32. Particularly, there is less chance of the mold destroying itself upon closing, in the event of a malfunction causing the motion of the parts to get out of phase. To the contrary, when inner mold parts move in a direction having a component which is of the direction of mold opening and closing, the mold can be more easily smashed in the event of a malfunction.

Referring to FIG. 9a, stripper ring 61 is shown, being the device by which the molded bucket is removed from lower mold half upon opening of the mold apparatus to a configuration exemplified by FIG. 9b. After the shot of plastic has entered mold cavity 34 it migrates into the inner cavity for forming the bucket handle and the other parts of the bucket, and is allowed to cool for a predetermined period of time.

Thereafter, a shot of compressed air is provided through air conduit 63 or a plurality of such conduits, to assist in loosening the adhesion of the newly molded bucket to mold half 32. Push rods 64 advance stripper ring 61, which may be a solid ring, which, of course, carries with it mold members 46 and stationary members 54, while impelling the newly molded bucket to separate from the core 66 of lower mold half 32. This is illustrated in FIG. 9b. As this happens, angle pins 68, carried in mold members 46, force the mold members to move radially outwardly away from the newly formed bucket, this being permitted by the presence of radial slot 70 in stripper plate 61. Thus the lower portion 72 of bucket 10 (FIG. 9b) is separated from the mold chamber-forming walls of mold members 46 as shown. Stationary members 54, of course, do not move outwardly, but it can be seen that bucket 10 can slide upwardly out of engagement with stationary members 54 because there are no undercuts there to retain the bucket. Accordingly the bucket may be easily removed, and the mold assembly may then close, ready for another shot. As the mold closes, mold members 46 are guided by angle pins 68 back into their initial, molding position where they are in end-to-end abutment, ready to receive the next portion of the mold shot. Accordingly, mold apparatus is provided for molding of a bucket having an initially integral but easily swingable handle. The integrally molded handle retention chambers which retain the bucket handles at each end define a first outer slot which extends typically in the direction of the motion of opening and closing of the mold halves, while a second inner slot of the handle retention chambers extends thereacross through the chamber in a direction substantially normal to the direction of the first slot. It is also contemplated that the outer slot may extend in a direction perpendicular to the direction of opening and closing of mold halves, although this creates some additional complexities of structure. In that circumstance the second slot would continue to be in generally normal relation to the direction of the first slot, which would mean that it would extend generally in the direction of mold opening and closing.

The above has been offered for illustrative purposes only and is not intended to limit the scope of the invention of this application, which is as defined in the claims below.

That which is claimed is:

1. In a mold assembly for making a bucket having a pivotable handle secured at opposed sides of said bucket plus integrally molded handle handle retention chambers, said handle terminating at each end in an enlargement positioned within one of said handle retention chambers, said handle retention chambers each being defined by walls having a first slot opening extending thereacross through which said handle extends, said first slot opening being of insufficient size to allow removal of the enlargement from the handle retention chamber, said mold assembly comprising openable and closable first and second mold halves defining a first molding chamber between them of the shape of said bucket and including handle retention chamber-defining means, said means including opposed, movable mold members capable of end-to-end abutment in a molding position, and a spaced relation in a mold-open position to permit removal of a bucket molded therein, said mold members defining inner molding chambers formed between them in their end-to-end abutting relation for molding said enlargements on the handle ends, and gates means communicating between the first and inner molding chambers, said mold members also having means for forming said first slot in buckets molded in said mold halves, and means for moving only in substantially linear motion said mold members between said end-to-end abutment and spaced relation.

2. The mold assembly of claim 1 in which said opposed, movable mold members also define a handle-forming mold chamber portion.

3. The mold assembly of claim 2 in which said mold halves define a stationary portion, relative to said mold members, which forms a mold chamber portion for forming sections of the bucket handle adjacent to said enlargements.

4. The mold assembly of claim 1 in which said mold members move between their molding and mold-open positions in a direction essentially normal to the direction of opening and closing of said mold halves.

5. The mold assembly of claim 1 in which said mold members contain fluid cooling conduits.

6. The mold assembly of claim 1 in which said mold members are each semi-circular in shape, said mold members entering into end-to-end abutting relation together at both respective ends of their semi-circular shape to define a pair of said inner molding chambers on opposed sides of said mold assembly.

7. A mold assembly for forming a bucket having a pivotal handle secured in opposed sides of the bucket, said bucket having integrally molded handle retention chambers at opposed sides of the bucket with the handle terminating at each end in an enlargement positioned within one of said handle retention chambers, said handle retention chambers each defining on its outer surface a first slot opening extending thereacross through which said handle extends. said mold assembly comprising openable and closable first and second mold halves defining a first mold chamber between them of the shape of said bucket and including handle retention chamber-defining means, said means including opposed, movable mold members capable of end-to-end abutment in a molding position, and a spaced relation in a mold-open position to permit removal of the bucket molded therein, said mold members defining inner molding chambers formed between them in their end-to-end abutting relation for molding said enlargements on the handle ends, and gate means communicating between the first and inner molding chambers, said mold members being movable only in motion which is essentially linear between the molding position and the mold-open position in a direction which is normal to the direction of the opening and closing of said first and second mold halves, said mold assembly also having means for forming said first slot opening in walls defining each handle retention chamber whereby said first slot opening extends in a direction longitudinal to the direction of opening and closing of said first and second mold halves.

8. The mold assembly of claim 7 in which said opposed movable mold members are each semi-circular in shape, said mold members entering into end-to-end abutting relation together at both respective ends of their semi-circular shape to define a pair of said inner molding chamberson opposed sides of said mold assembly.

9. The mold assembly of claim 8 in which said opposed movable mold members also define a handle-forming mold chamber portion.

10. The mold assembly of claim 9 in which one of said mold halves defines a pair of opposed stationary portions, relative to said mold members, which form a mold chamber portion for forming sections of the bucket handle adjacent to said enlargement.

11. The mold assembly of claim 10 in which said mold members contain fluid cooling conduits.

12. The mold assembly of claim 11 in which said mold members and stationary portion are carried by the mold half which defines the inner walls of said first molding chamber.

13. The mold assembly of claim 12 in which means are defined to provide to the handle retention chambers molded in each bucket opposed slide openings spaced inwardly from its outer surface defining a second slot extending therefrom in a direction substantially normal to the direction of a first, outer slot of said handle retention chambers.

14. The mold assembly of claim 7 in which means are defined to provide to the handle retention chambers molded in each bucket opposed slide openings spaced inwardly from its outer surface defining a second slot extending therefrom in a direction substantially normal to the direction of a first, outer slot of said handle retention chambers.

15. The mold assembly of claim 1 in which said mold members also define means for forming a second slot within each handle retention chambers, said second slot being positioned inwardly from said first slot and extending across said handle retention chamber in a direction substantially normal to the direction of said first slot.

* * * * *